(12) United States Patent
Kim et al.

(10) Patent No.: US 11,527,836 B2
(45) Date of Patent: Dec. 13, 2022

(54) BEAMFORMING ANTENNA MODULE COMPRISING LENS

(71) Applicant: Samsung Electronics Co., Ltd., Suwon-si (KR)

(72) Inventors: Yoongeon Kim, Suwon-si (KR); Seungtae Ko, Suwon-si (KR); Hyunjin Kim, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/768,334

(22) PCT Filed: Nov. 22, 2018

(86) PCT No.: PCT/KR2018/014408
§ 371 (c)(1),
(2) Date: May 29, 2020

(87) PCT Pub. No.: WO2019/124773
PCT Pub. Date: Jun. 27, 2019

(65) Prior Publication Data
US 2021/0126377 A1    Apr. 29, 2021

(30) Foreign Application Priority Data

Dec. 19, 2017  (KR) ...................... 10-2017-0175518

(51) Int. Cl.
*H01Q 15/02* (2006.01)
*H01Q 19/06* (2006.01)
(Continued)

(52) U.S. Cl.
CPC ............. *H01Q 19/062* (2013.01); *H01Q 3/30* (2013.01); *H01Q 15/10* (2013.01); *H01Q 21/061* (2013.01); *H04B 7/0617* (2013.01)

(58) Field of Classification Search
CPC ........ H01Q 19/062; H01Q 3/30; H01Q 15/10; H01Q 21/061; H01Q 19/065;
(Continued)

(56) References Cited

U.S. PATENT DOCUMENTS 3,835,469 A  *  9/1974 Chen .................... H01Q 3/2658
                                                        343/754
6,075,492 A      6/2000 Schmidt et al.
(Continued)

FOREIGN PATENT DOCUMENTS

JP    2000-244237 A    9/2000
KR    10-2013-0075649 A    7/2013
(Continued)

OTHER PUBLICATIONS

Mei Jiang et al: "Metamaterial-Based Thin Planar Lens Antenna for Spatial Beamforming and Multibeam Massive MIMO", IEEE Transactions on Antennas and Propagation, XP055581902, Feb. 1, 2017.
(Continued)

*Primary Examiner* — Awat M Salih
(74) *Attorney, Agent, or Firm* — Jefferson IP Law, LLP

(57) ABSTRACT

The present invention relates to a communication technique, which is a convergence of IoT technology and 5G communication system for supporting higher data transmission rate than 4G system, and a system for same. The present invention can be applied to smart services (e.g., smart homes, smart buildings, smart cities, smart cars or connected cars, health care, digital education, retail businesses, security-and safety-related services and the like) on the basis of 5G communication technology and IoT-related technology. The present invention provides a beamforming antenna module comprising: a beamforming antenna for radiating a beam in a particular direction, a first lens positioned a preset first distance away from a beam radiation surface of the beam-
(Continued)

forming antenna and for varying the phase of a beam radiated by means of the beamforming antenna; and a second lens positioned a preset second distance away from a beam radiation surface of the first lens and for varying the phase of the beam radiated by means of the beamforming antenna.

10 Claims, 21 Drawing Sheets

(51) Int. Cl.
    *H01Q 3/30*       (2006.01)
    *H01Q 15/10*     (2006.01)
    *H01Q 21/06*     (2006.01)
    *H04B 7/06*      (2006.01)

(58) Field of Classification Search
    CPC ...... H01Q 19/104; H01Q 3/26; H01Q 21/065; H01Q 1/243; H04B 7/0617
    See application file for complete search history.

(56) References Cited

U.S. PATENT DOCUMENTS

| | | |
|---|---|---|
| 6,246,375 B1 | 6/2001 | Kamada et al. |
| 8,659,502 B2 | 2/2014 | Lam et al. |
| 9,041,603 B2 | 5/2015 | Roper et al. |
| 9,425,513 B2 | 8/2016 | Oh et al. |
| 10,573,966 B2 | 2/2020 | Ko et al. |
| 2007/0146901 A1* | 6/2007 | Noda ............... G02B 13/22 359/784 |
| 2007/0285327 A1 | 12/2007 | Paschen et al. |
| 2008/0272955 A1 | 11/2008 | Yonak et al. |
| 2009/0315794 A1 | 12/2009 | Alamouti et al. |
| 2010/0231436 A1 | 9/2010 | Focke et al. |
| 2011/0025432 A1 | 2/2011 | Gagnon et al. |
| 2012/0274525 A1 | 11/2012 | Lam et al. |
| 2014/0313090 A1 | 10/2014 | Oh et al. |
| 2015/0116154 A1 | 4/2015 | Artemenko et al. |
| 2015/0200452 A1 | 7/2015 | Oh et al. |
| 2017/0062948 A1 | 3/2017 | Artemenko et al. |
| 2020/0021034 A1 | 1/2020 | Ko et al. |

FOREIGN PATENT DOCUMENTS

| | | |
|---|---|---|
| KR | 10-2017-0108365 A | 9/2017 |
| KR | 10-2018-0096287 A | 8/2018 |
| KR | 10-2018-0096362 A | 8/2018 |

OTHER PUBLICATIONS

Extended European Search Report dated Dec. 8, 2020 issued in European Application No. 18891910.4.

* cited by examiner

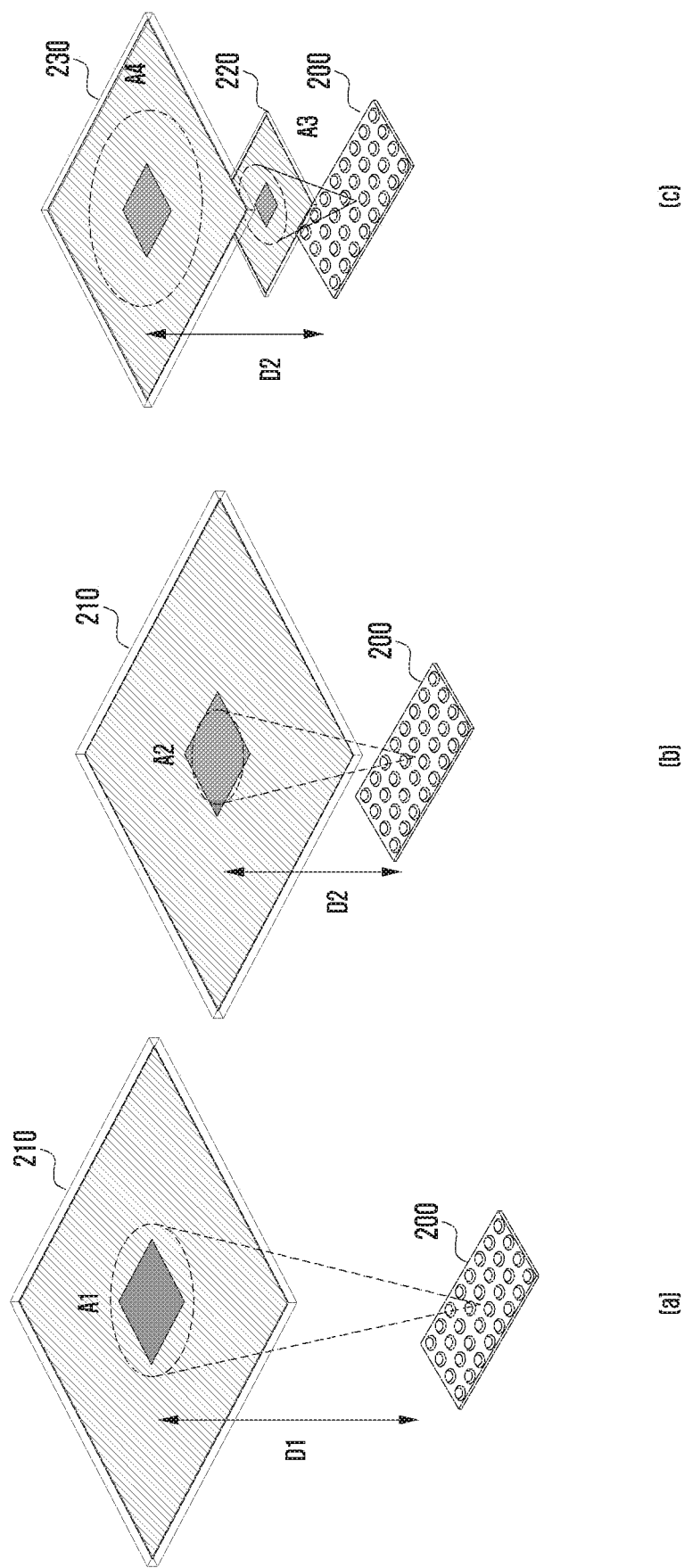

FIG. 10B
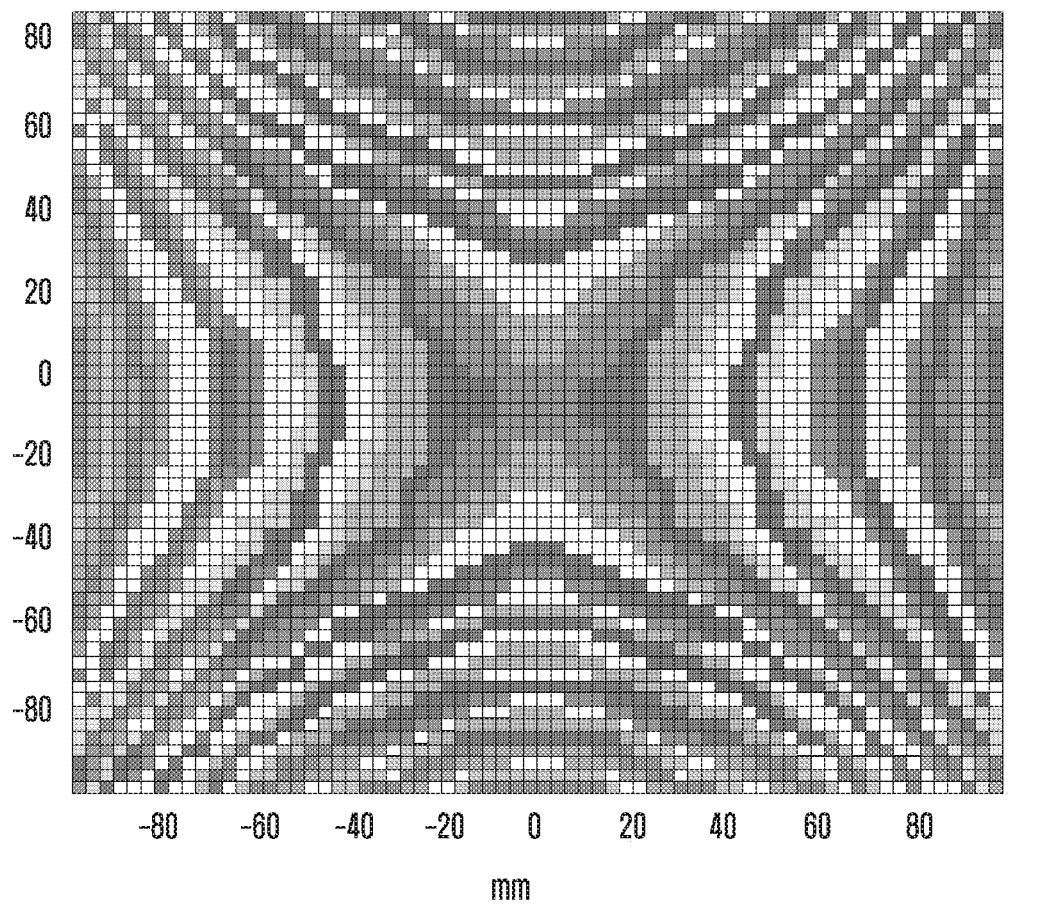
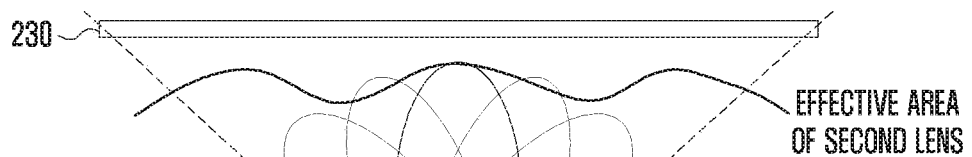
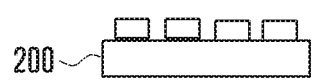

BEAMFORMING ANTENNA MODULE COMPRISING LENS

TECHNICAL FIELD

The disclosure relates to a beamforming antenna module including a lens to secure a high gain and coverage in a 5G communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4th generation (4G) Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large-scale antenna techniques are discussed in 5G communication systems. In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

In this regard, the Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "Security technology" have been demanded for IoT implementation, a sensor network, Machine-to-Machine (M2M) communication, Machine Type Communication (MTC), and so forth, have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services, through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered an example of convergence between the 5G technology and the IoT technology.

DISCLOSURE OF INVENTION

Technical Problem

The disclosure proposes a structure of an antenna module capable of maximizing the performance of a lens.

More specifically, in order to maximize the performance of a lens, it is necessary to secure a sufficient separation distance between a lens and an antenna. However, the disclosure provides an antenna module structure capable of maximizing the performance of a lens while reducing a separation distance between a lens and an antenna through overlapping deployment of a plurality of lenses.

Solution to Problem

According to the disclosure, a beamforming antenna module includes a beamforming antenna configured to radiate a beam in a specific direction; a first lens spaced apart for a predetermined first distance from a beam radiation surface of the beamforming antenna and configured to change a phase of a beam radiated from the beamforming antenna; and a second lens spaced apart for a predetermined second distance from a beam radiation surface of the first lens and configured to change the phase of the beam radiated from the beamforming antenna.

A phase distribution of the first lens may be different from a phase distribution of the second lens.

A phase of the first lens may be decreased as going from a center of the first lens toward an outline of the first lens, and a phase of the second lens may be increased as going from a center of the second lens toward an outline of the second lens.

A phase of the first lens may be increased as going from a center of the first lens toward an outline of the first lens, and a phase of the second lens may be decreased as going from a center of the second lens toward an outline of the second lens.

The beamforming antenna module may further include a beamforming antenna case formed by a dielectric lens deployed between the beamforming antenna and the first lens and configured to surround the beam radiation surface of the beamforming antenna, wherein the first lens and the second lens may be flat lenses.

The first lens may be a dielectric lens having a shape of a concave lens, and the second lens may be a flat lens.

The first lens may be a dielectric lens having a shape of a concave lens, and the second lens may be a dielectric lens having a shape of a convex lens.

According to the disclosure, a beamforming antenna module includes a beamforming antenna configured to radiate a beam in a specific direction; a first lens spaced apart for a predetermined first distance from a beam radiation surface of the beamforming antenna and configured to change a phase of a beam radiated from the beamforming antenna through combination of unit cells having different phase change levels; and a second lens spaced apart for a predetermined second distance from a beam radiation surface of the first lens and configured to change the phase of the beam radiated from the first lens through combination of unit cells having different phase change levels.

The unit cells of the first lens may be successively deployed from a center of the first lens in a direction of an outline of the first lens in a descending order of the phase change level, and the unit cells of the second lens may be successively deployed from a center of the second lens in a direction of an outline of the second lens in an ascending order of the phase change level.

A phase distribution of the first lens may have a shape of a parabola that is convex toward the second lens, a phase distribution of the second lens may have a shape of a parabola that is convex toward the first lens, and a curvature of the phase distribution parabola of the first lens may be lower than a curvature of the phase distribution parabola of the second lens.

The unit cells of the first lens may be successively deployed from a center of the first lens in a direction of an outline of the first lens in an ascending order of the phase change level, and the unit cells of the second lens may be successively deployed from a center of the second lens in a direction of an outline of the second lens in a descending order of the phase change level.

A phase distribution of the first lens may have a shape of a parabola that is concave toward the beamforming antenna, a phase distribution of the second lens may have a shape of a parabola that is convex toward a beam radiation direction of the second lens, and a curvature of the phase distribution parabola of the first lens may be higher than a curvature of the phase distribution parabola of the second lens.

The beamforming antenna module may further include a beamforming antenna case formed in a shape of a dielectric lens deployed between the beamforming antenna and the first lens and configured to surround the beam radiation surface of the beamforming antenna, wherein the first lens and the second lens may be flat lenses.

The first lens may be a dielectric lens having a shape of a concave lens, and the second lens may be a flat lens.

The first lens may be a dielectric lens having a shape of a concave lens, and the second lens may be a dielectric lens having a shape of a convex lens.

According to the disclosure, an electronic device may include a beamforming antenna configured to radiate a beam in a specific direction; a first lens spaced apart for a predetermined first distance from a beam radiation surface of the beamforming antenna and configured to change a phase of a beam radiated from the beamforming antenna; and a second lens spaced apart for a predetermined second distance from a beam radiation surface of the first lens and configured to change the phase of the beam radiated from the beamforming antenna, wherein a phase distribution of the first lens may be different from a phase distribution of the second lens.

Advantageous Effects of Invention

According to an embodiment of the disclosure, the performance of the lens can be maximized even if the separation distance between the beamforming antenna and the lens is not sufficiently secured, and through this, the gain value and the coverage of the beamforming antenna can be improved.

BRIEF DESCRIPTION OF DRAWINGS

FIG. 4 is a diagram illustrating an antenna module structure in which a plurality of lenses are deployed on a beamforming antenna according to an embodiment of the disclosure.

FIG. 10B is a diagram illustrating a first lens and the shape of a beam having passed through the first lens according to a second embodiment of the disclosure.

MODE FOR THE INVENTION

Figure 1:
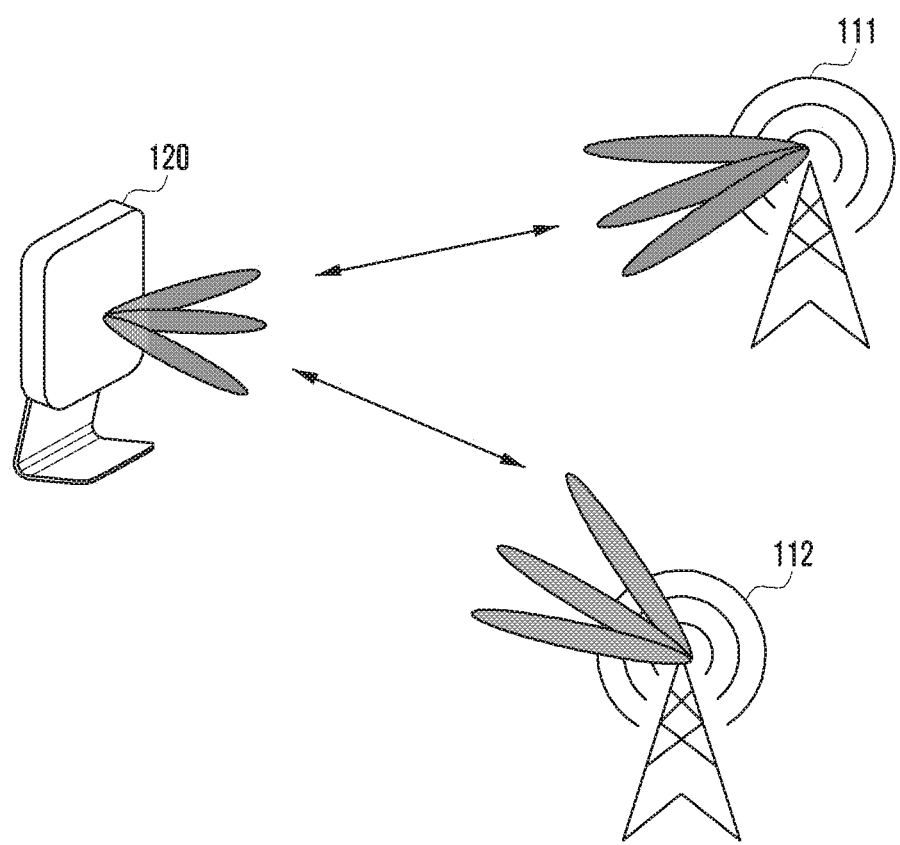
FIG. 1 is a diagram explaining a mobile communication system supporting beamforming.

In explaining embodiments of the disclosure, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used in an embodiment, means, but is not limited to, a software or hardware component, such as FPGA or ASIC, which performs certain tasks. However, "unit" is not meant to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card. Further, in an embodiment, "unit" may include one or more processors.

FIG. 1 is a diagram explaining a mobile communication system supporting beamforming.

FIG. 1 is to explain communication between a communication device 120 including an antenna module according to the disclosure and a plurality of base stations 111 and 112. As described above, a 5G mobile communication may have a broad frequency bandwidth.

However, due to the broad frequency bandwidth, a gain value and a coverage of radio waves transmitted from the base station 111 or 112 or the communication device 120 may be weakened. In order to solve this problem, a 5G mobile communication system may basically use a beamforming technique.

That is, the base station 111 or 112 or the communication device 120 including the antenna module supporting a 5G mobile communication system may form beams at various angles, and it may perform communication using the beam having the best communication environment among the formed beams.

With reference to FIG. 1, as an example, the communication device 120 may form three kinds of beams being radiated at different angles, and corresponding to this, the base station may also form three kinds of beams being radiated at different angles. For example, the communication device 120 may radiate three kinds of beams having beam indexes 1, 2, and 3, and the first base station 111 may radiate three kinds of beams having beam indexes 4, 5, and 6, and the second base station may radiate three kinds of beams having beam indexes 7, 8, and 9.

In this case, through communication among the communication device 120, the first base station 111, and the second base station 112, the communication device and the first base station may perform communication with each other through the beam of the beam index 2 of the communication device 120 and the beam of the beam index 5 of the first base station, which have the best communication environments. In the same manner, the communication device 120 and the second base station 112 may also perform communication with each other.

Meanwhile, FIG. 1 illustrates only an example to which the 5G communication system can be applied. That is, the number of beams that can be radiated by the communication device or the base station may be increased or decreased, and thus the scope of the disclosure should not be limited to the number of beams illustrated in FIG. 1.

The communication device 120 illustrated in FIG. 1 includes various devices capable of performing communication with the base station. For example, the communication device 120 may include customer premises equipment (CPE) or a wireless repeater.

Figure 2:
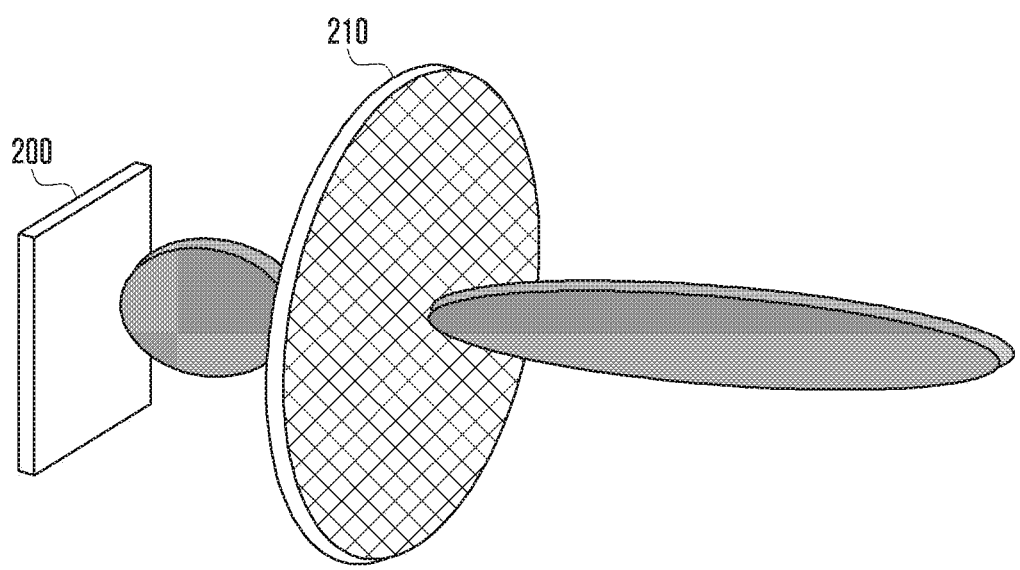
FIG. 2 is a diagram explaining the structure of an antenna module including a lens.

FIG. 2 is a diagram explaining the structure of an antenna module including a lens.

An antenna module according to the disclosure may include an antenna 200 including at least one antenna array and a lens 210. That is, the antenna 200 according to the disclosure may include a plurality of antenna arrays. For example, one antenna 200 may include four antenna arrays, and by respectively adjusting the angles of the beams radiated through the antenna arrays, the angle of the beam being radiated through the antenna 200 may be finally determined.

The beam being radiated through the antenna 200 may pass through the lens 210 that is deployed to be spaced apart for a predetermined distance from the antenna 200. The lens 210 may change the phase of the beam (or radio waves) incident to the lens.

Specifically, the lens 210 may change all phase values of the beams incident to the lens 210 to the same phase value through a pattern formed on the lens and it radiates the beams having the same phase value to outside.

Accordingly, the beam being radiated to the outside through the lens 210 has a shape that is sharper than the shape of the beam being radiated through the antenna 200. That is, the gain value of the beam being radiated through the antenna can be improved using the lens 210.

Meanwhile, the separation distance between the beamforming antenna 200 and the lens, which form the beams in the antenna module structure illustrated in FIG. 2, may exert an influence on the performance of the lens. More specifically, the performance of the lens may be determined based on an electric field distribution area of the beam incident to the lens. In general, as the electric field distribution area of the beam incident to the lens becomes larger, the lens has the more improved performance. The details thereof will be described later through FIGS. 3A to 3D.

FIGS. 3A to 3D are diagrams illustrating an intensity distribution and a phase distribution of a beam being radiated through a lens in accordance with a distance between a beamforming antenna and the lens.

Figure 3A:
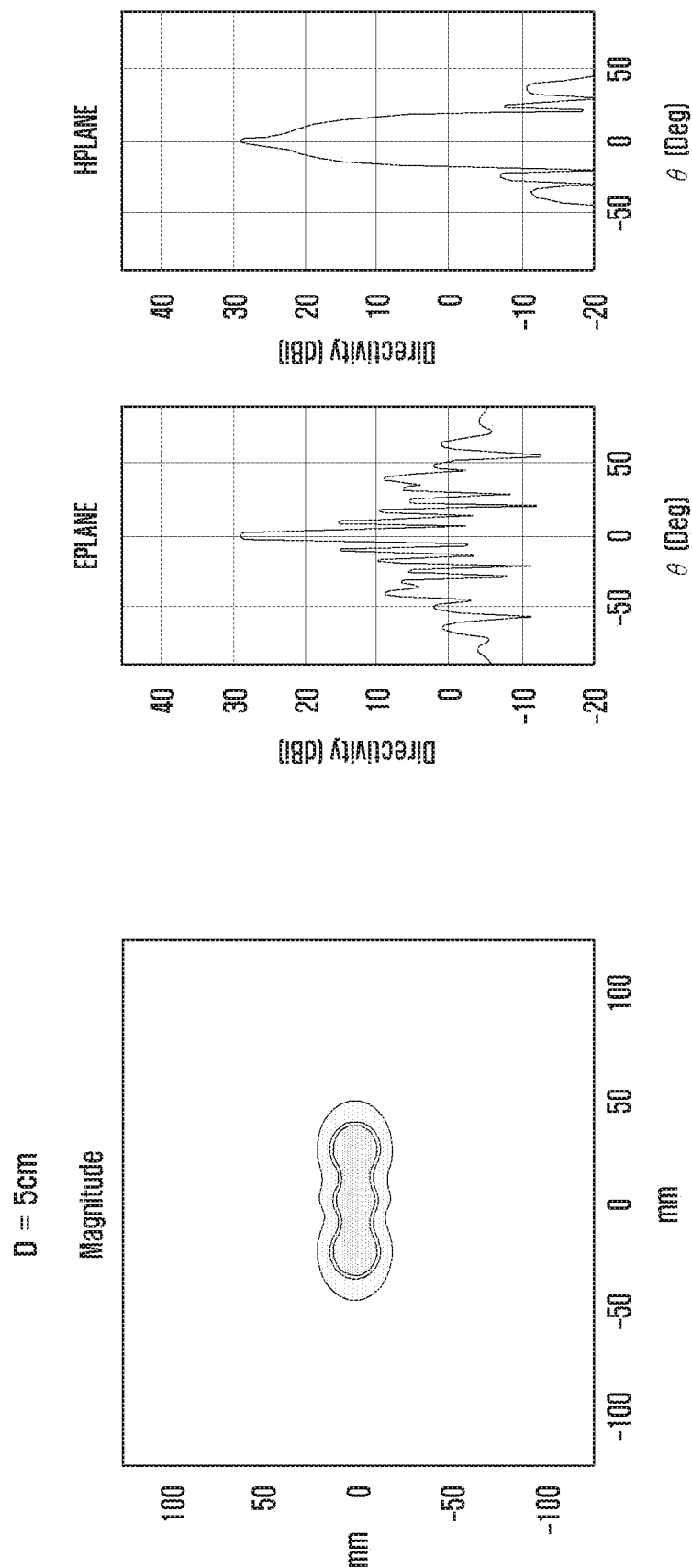
FIGS. 3A to 3D are diagrams illustrating an intensity distribution and a phase distribution of a beam being radiated through a lens in accordance with a distance between a beamforming antenna and the lens.
Figure 3B:
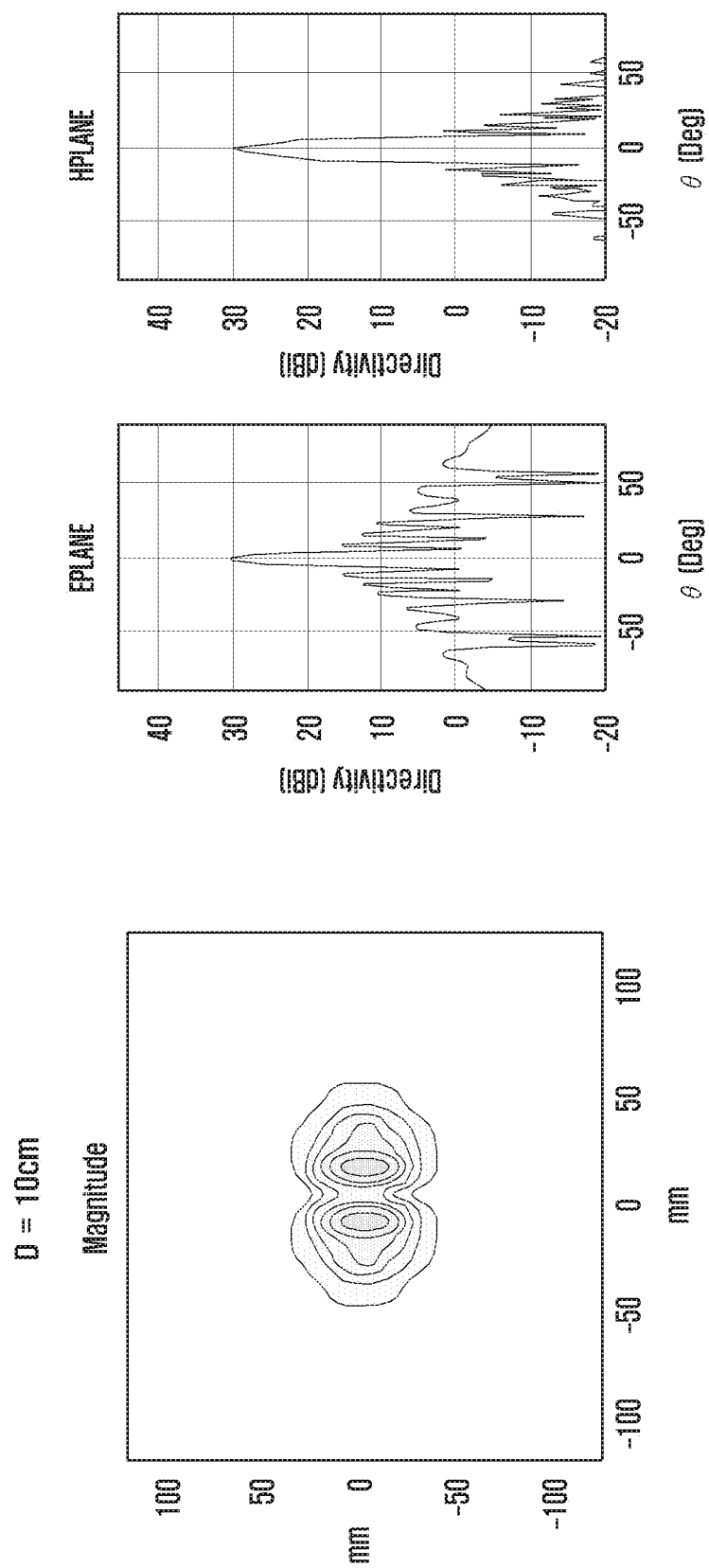
Figure 3C:
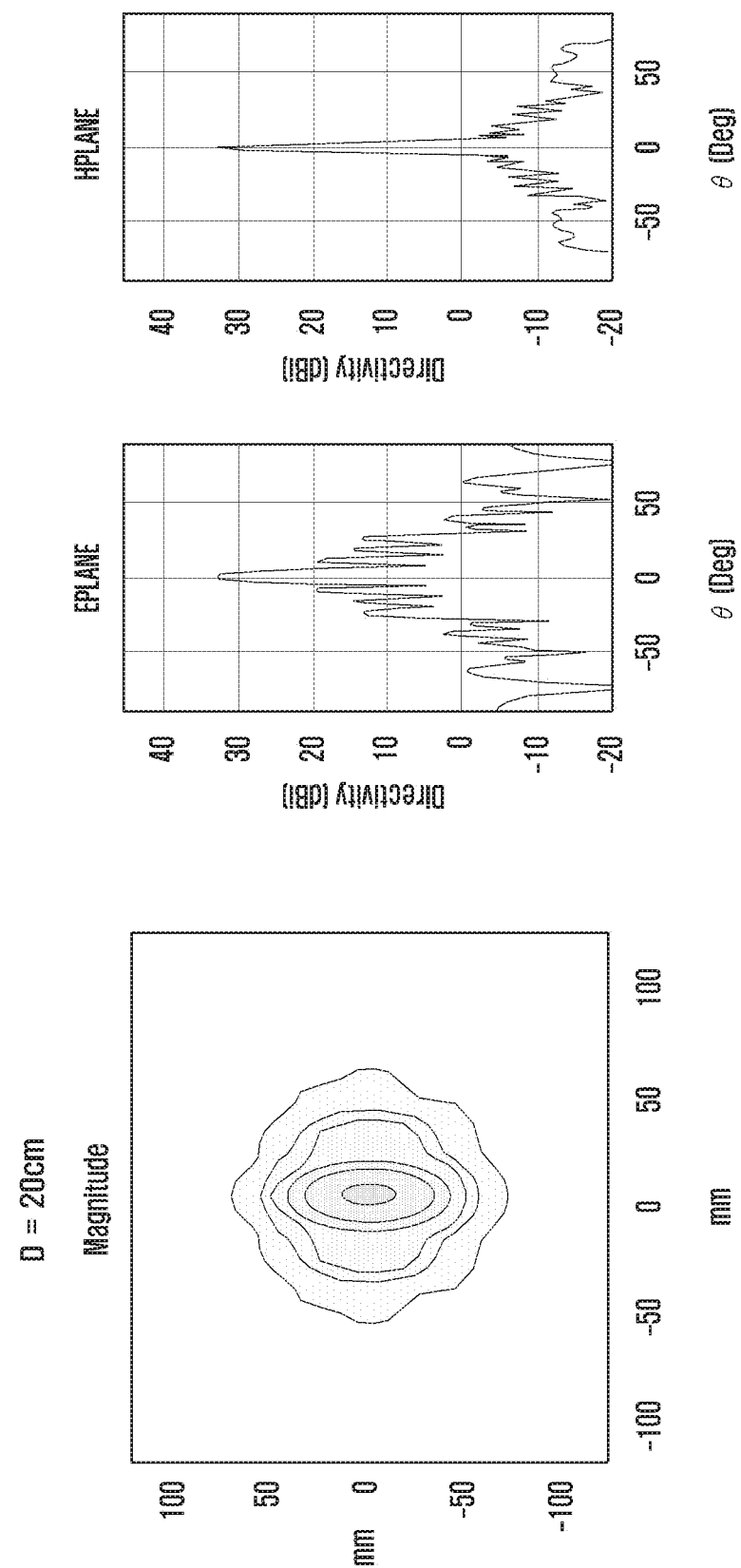
Figure 3D:
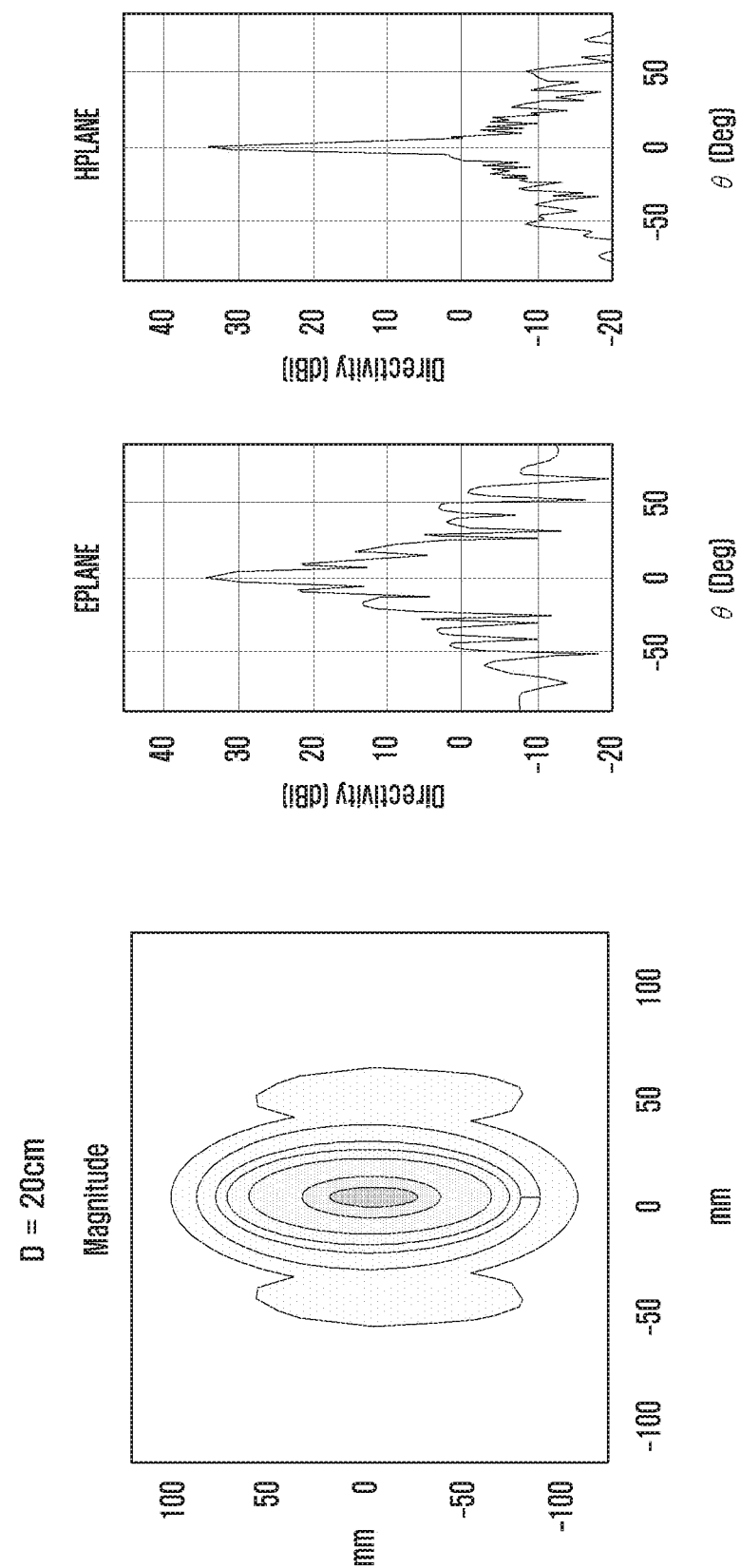

FIG. 3A is a diagram illustrating an intensity and a phase distribution of a beam incident to a lens in the case where a separation distance between a beamforming antenna and the lens is 5 cm, and FIG. 3B is a diagram illustrating the intensity and the phase distribution of the beam incident to the lens in the case where the separation distance between the beamforming antenna and the lens is 10 cm. Further, FIG. 3C is a diagram illustrating the intensity and the phase distribution of the beam incident to the lens in the case where the separation distance between the beamforming antenna and the lens is 20 cm, and FIG. 3D is a diagram illustrating the intensity and the phase distribution of the beam incident to the lens in the case where the separation distance between the beamforming antenna and the lens is 30 cm.

In FIGS. 3A to 3D, the phase distribution of the beam incident to the lens is dividedly illustrated on E-plane and H-plane. The E-plane and H-plane may mean reference planes for a device generating electromagnetic waves, such as an antenna. More specifically, in the case of a linear polarized antenna, the E-plane may be a plane including the maximum beam radiation direction. That is, the E-plane may determine a radio wave polarization or a beam radiation direction. As an example, in the case of a vertical polarized antenna, the E-plane may coincide with a vertical/elevation plane, and in the case of a horizontal polarized antenna, the E-plane may coincide with a horizontal/azimuth plane.

Meanwhile, in the case of the linear polarized antenna, the H-plane may be a plane including a magnetic field vector and the maximum beam radiation direction. Further, the H-plane may form a right angle with the E-plane as described above. As an example, in the case of the vertical polarized antenna, the H-plane may coincide with the horizontal/azimuth plane, and in the case of the horizontal polarized antenna, the H-plane may coincide with a vertical/elevation plane.

Through comparison of the beam intensity distributions as disclosed in FIGS. 3A to 3D, it can be identified that as the separation distance between the beamforming antenna and the lens becomes larger, the area of the beam incident to the lens becomes larger, and corresponding to this, it can be known that the area of the beam portion having a high beam intensity among the beams incident to the lens becomes larger.

Further, through the beam phase distributions of FIGS. 3A to 3D, it can be identified that the maximum directivity of the beam is improved. More specifically, it can be identified that if the phase of all the beams in FIGS. 3A to 3D is 0°, the directivity value of the beam becomes the maximum value, and it can be identified that as the separation distance between the beamforming antenna and the lens is increased, the maximum directivity value of the beam is increased. Here, the directivity means the degree of beam concentration in one direction, and as the directivity becomes higher, the shape of the beam becomes sharper.

That is, through FIGS. 3A to 3D, it can be identified that as the separation distance between the beamforming antenna and the lens becomes longer, the radiation area and the directivity of the beam incident to the lens becomes greater, and thus the performance of the lens is improved. However, due to the limitation of the separation distance between the beamforming antenna and the lens, it is not possible to infinitely increase the separation distance between the beamforming antenna and the lens. Accordingly, hereinafter, an antenna module structure to solve the above-described problems is disclosed.

FIG. 4 is a diagram illustrating an antenna module structure in which a plurality of lenses are deployed on a beamforming antenna according to an embodiment of the disclosure.

The antenna module structure illustrated in (a) and (b) of FIG. 4 is the antenna module structure in the related art. More specifically, the antenna module structure in (a) corresponds to a case where the separation distance between the beamforming antenna 200 and the lens 210 is $D_1$. In this case, the electric field distribution area that is projected onto the lens 210 through the beamforming antenna 200 may be $A_1$.

Further, the antenna module structure in (b) corresponds to a case where the separation distance between the beamforming antenna 200 and the lens 210 is $D_2$. Here, $D_2$ is smaller than $D_1$. That is, the separation distance between the beamforming antenna and the lens in the antenna module structure in (b) is smaller than the separation distance between the beamforming antenna and the lens in the antenna module structure in (a). In this case, the electric field distribution area that is projected onto the lens 210 through the beamforming antenna 200 may be $A_2$. As described above with reference to FIG. 3, the area $A_2$ would be smaller than the area $A_1$.

Accordingly, the lens performance in the antenna module structure in (a) would be better than the lens performance in the antenna module structure in (b). However, because the separation distance between the beamforming antenna and the lens in the antenna module structure in (a) is larger than the separation distance between the beamforming antenna and the lens in the antenna module structure in (b), the size of the antenna module in (a) would be larger than the size of the antenna module in (b).

Meanwhile, the antenna module structure in (c) is the beamforming antenna module structure to be disclosed in the disclosure. The antenna module according to an embodiment of the disclosure may include a beamforming antenna 200 configured to radiate a beam in a specific direction, a first lens 220 spaced apart for a predetermined first distance from a beam radiation surface of the beamforming antenna 200 and configured to change a phase of a beam radiated from the beamforming antenna 200, and a second lens 230 spaced apart for a predetermined second distance from a beam radiation surface of the first lens 220 and configured to change the phase of the beam radiated from the beamforming antenna 200.

That is, the antenna module structure according to an embodiment of the disclosure may include two lenses 220 and 230, and even if a sufficient separation distance is not secured between the lens and the beamforming antenna through the two lenses, the performance of the lens can be maximized.

More specifically, the separation distance $D_2$ between the beamforming antenna 200 and the second lens 230 in the antenna module structure in (c) is equal to the separation distance between the beamforming antenna 200 and the lens 210 in the antenna module structure in (b). In contrast, the electric field distribution area $A_4$ projected onto the second lens 230 is larger than the electric field distribution area $A_3$ projected onto the lens 210 in the antenna module structure in (b). That is, it can be identified that the performance of the second lens 230 in the antenna module structure in (c) is better than the performance of the lens 210 in the antenna module structure in (b) having the equal separation distance $D_2$.

Meanwhile, it can be identified that the electric field distribution area $A_4$ projected onto the second lens 230 in the antenna module structure in (c) is larger than the electric field distribution area $A_1$ projected onto the lens 210 in the antenna module structure in (a). That is, in the case of deploying two lenses 220 and 230 in the antenna module, even if the separation distance $D_2$ between the second lens 230 and the beamforming antenna 200 is shorter than the separation distance $D_1$ in the antenna module structure in (a), the performance of the second lens 230 in the antenna module structure in (c) may be better than the performance of the lens 210 in the antenna module structure in (a).

The reason why the performance of the lens in the antenna module structure in (c) is better than the performance of the lens in the antenna module structure in (a) even if the separation distance between the lens and the beamforming antenna in the antenna module structure in (c) is shorter than that in the antenna module structure in (a) is that the two lenses 220 and 230 are deployed in the beamforming antenna module as described above. More specifically, the beam being radiated through the beamforming antenna 200 may be primarily projected onto the first lens 220 with the distribution area $A_3$, and the first lens 220 may change the phase of the beam so that the beam is transferred to the second lens 230 with the distribution area $A_4$ of the electric field of the beam.

Meanwhile, although it is exemplified that only two lenses are deployed in one beamforming antenna module, the scope of the disclosure should not be limited thereto. That is, two or more lenses may exist in order to improve the gain value of the beam being radiated through the beamforming antenna. Accordingly, if the gain value of the beam can be improved in the same operational principle as the operational principle disclosed in the disclosure, this may be within the scope of the disclosure regardless of the number of lenses.

Figure 5A:
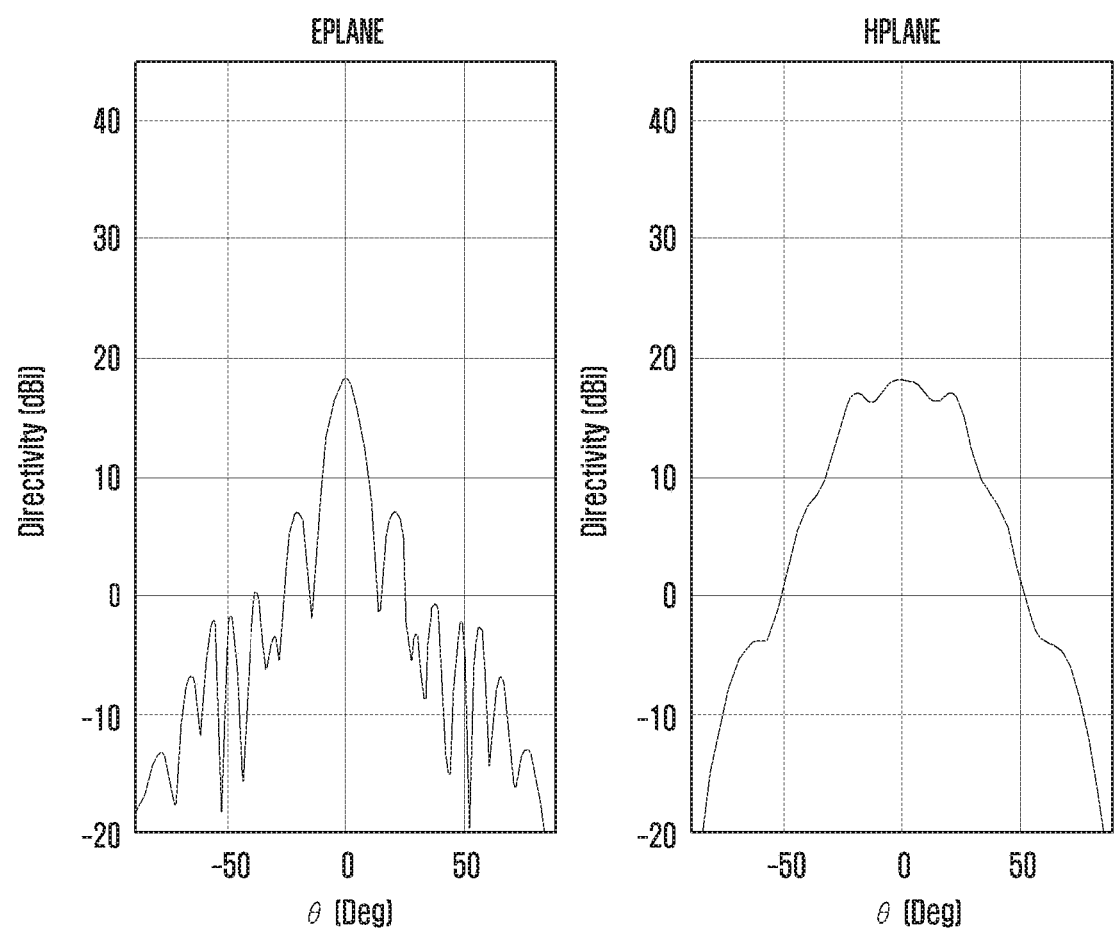
FIG. 5A is a diagram illustrating a phase distribution of a beam having passed through a first lens in an antenna module structure according to an embodiment of the disclosure.

FIG. 5A is a diagram illustrating a phase distribution of a beam having passed through a first lens in an antenna module structure according to an embodiment of the disclosure.

In the case of following the graph of FIG. 5A, it can be known that the gain value of the beam having passed through the first lens is not greatly improved. However, as illustrated in FIG. 5A, the beam on the H-plane does not have a sharp directivity. That is, the beam having passed through the first lens may not be in the sharp shape, but it may be in the broad flat beam shape. Accordingly, it may be predicted that the beam having passed through the first lens is broadly spread and projected onto the second lens with a broad beam electric field distribution area. The details thereof will be described later with reference to FIGS. 6 to 9B.

Figure 5B:
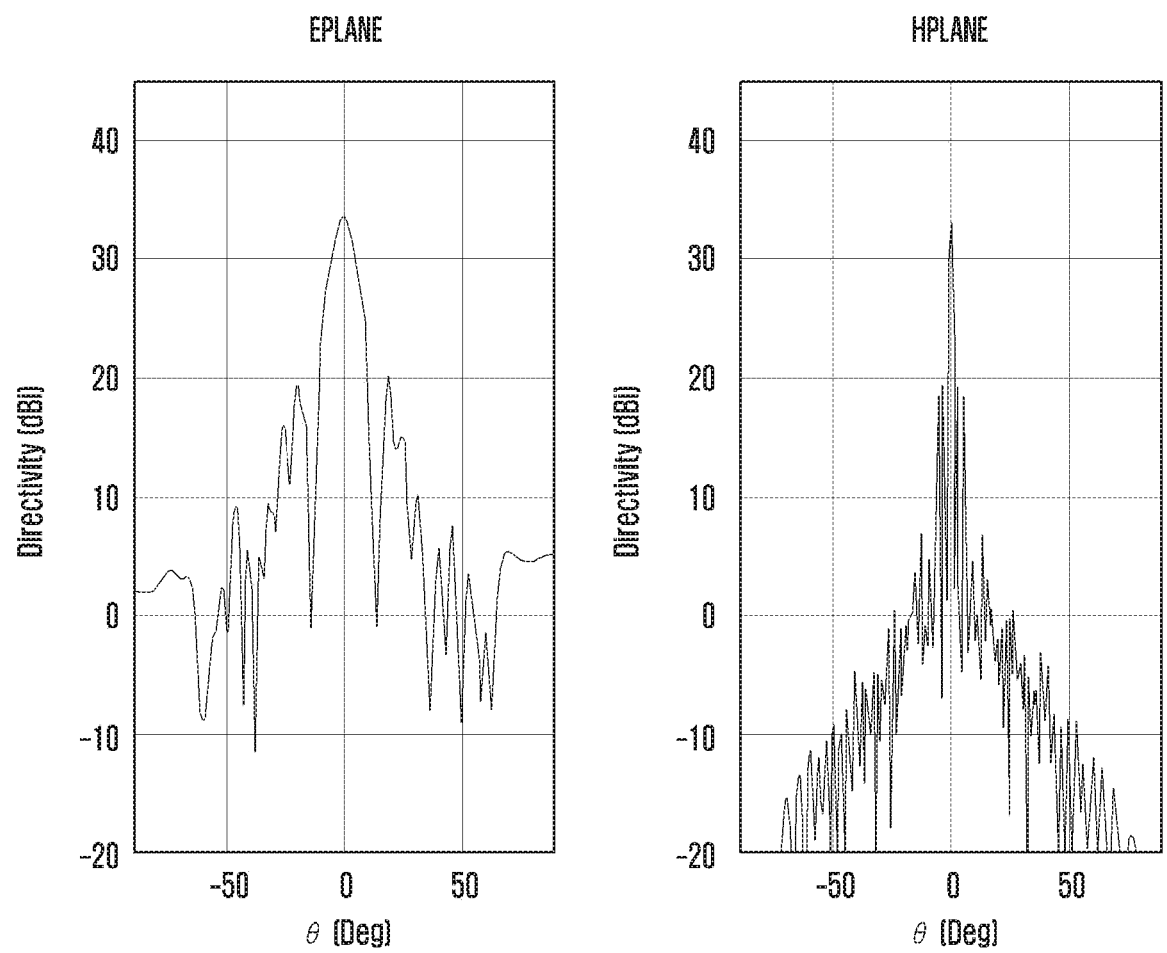
FIG. 5B is a diagram illustrating a phase distribution of a beam having passed through a second lens in an antenna module structure according to an embodiment of the disclosure.

FIG. 5B is a diagram illustrating a phase distribution of a beam having passed through a second lens in an antenna module structure according to an embodiment of the disclosure.

In the case of following the graph of FIG. 5B, it can be known that the gain value of the beam having passed through the second lens is greatly improved as compared with the gain value of the beam having passed through the first lens. Further, because the beam directivity has a sharp shape as compared with that in FIG. 5A, it may be predicted that the beam having passed through the second lens may be in the shape of a pencil beam having a sharp shape. The details thereof will be described later with reference to FIGS. 6 to 9B.

Figure 6:
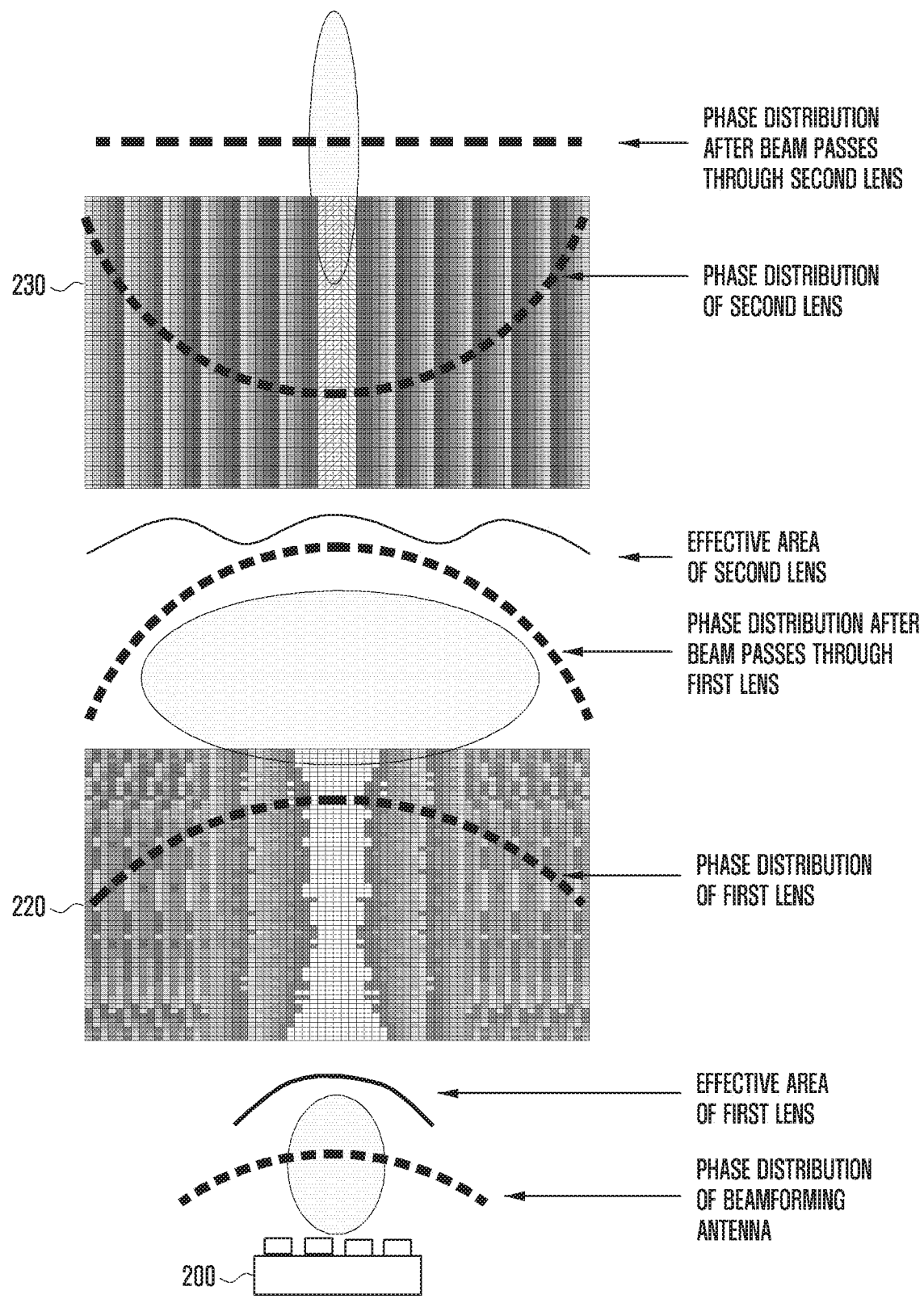
FIG. 6 is a diagram illustrating an antenna module structure according to a first embodiment of the disclosure.

FIG. 6 is a diagram illustrating an antenna module structure according to a first embodiment of the disclosure.

FIG. 6 illustrates a detailed process in which the phase of the beam being radiated through the beamforming antenna 200 is changed through the first lens 220 and the second lens 230. Primarily, the beamforming antenna 200 may radiate the beam having the beamforming antenna phase distribution illustrated in FIG. 6 toward the first lens 220. In this case, the first lens effective area of the beam being radiated onto the first lens 220 is as illustrated in FIG. 6 (the effective area of the first lens may correspond to $A_3$ of the antenna module structure in (c) of FIG. 4).

In the antenna module structure according to the first embodiment of the disclosure, the first lens 220 may have the lens phase distribution as illustrated in FIG. 6. More specifically, the phase distribution of the first lens 220 may be in the shape of a parabola that is convex toward the second lens 230. As illustrated in FIG. 6, the structure of the first lens 220 having the first lens phase distribution will be described later with reference to FIG. 7A.

The beam having penetrated the first lens having the phase distribution illustrated in FIG. 6 may have the shape of a broad flat beam as described above. Further, the phase distribution of the flat beam, that is, the beam having passed through the first lens, may have the shape of a parabola having a higher curvature than the curvature of the first lens phase distribution parabola as illustrated in FIG. 6. This is because the first lens phase distribution of the beamforming antenna phase distribution corresponds to a parabola that is convex in the same direction.

Further, after penetrating the first lens 220, the shape of the beam being radiated through the beamforming antenna 200 becomes broad as illustrated in FIG. 6, and thus the effective area of the second lens onto which the beam having penetrated the first lens is projected may be considerably larger than the effective area of the first lens (the effective area of the second lens may correspond to $A_4$ of the antenna module structure in (c) of FIG. 4).

In the antenna module structure according to the first embodiment of the disclosure, the second lens 230 may have the lens phase distribution as illustrated in FIG. 6. More specifically, the phase distribution of the second lens 230 may be in the shape of a parabola that is convex toward the first lens 220. That is, the first lens phase distribution parabola may have an opposite shape to the second lens phase distribution parabola.

In addition, the curvature of the second lens phase distribution parabola may be higher than the curvature of the first lens phase distribution parabola. This is because the second lens phase distribution parabola should correspond to the phase distribution parabola of the beam after passing through the first lens, and as described above, the curvature of the phase distribution parabola of the beam after passing through the first lens is higher than the curvature of the first lens phase distribution parabola. The structure of the second lens 230 having the second lens phase distribution will be described later with reference to FIG. 7B.

Meanwhile, it can be identified that the phase distribution of the beam of the beamforming antenna having penetrated the second lens 230 has a linear phase distribution as illustrated in FIG. 6, and through this, the beam having penetrated the second lens 230 may become a sharp pencil beam.

Figure 7A:
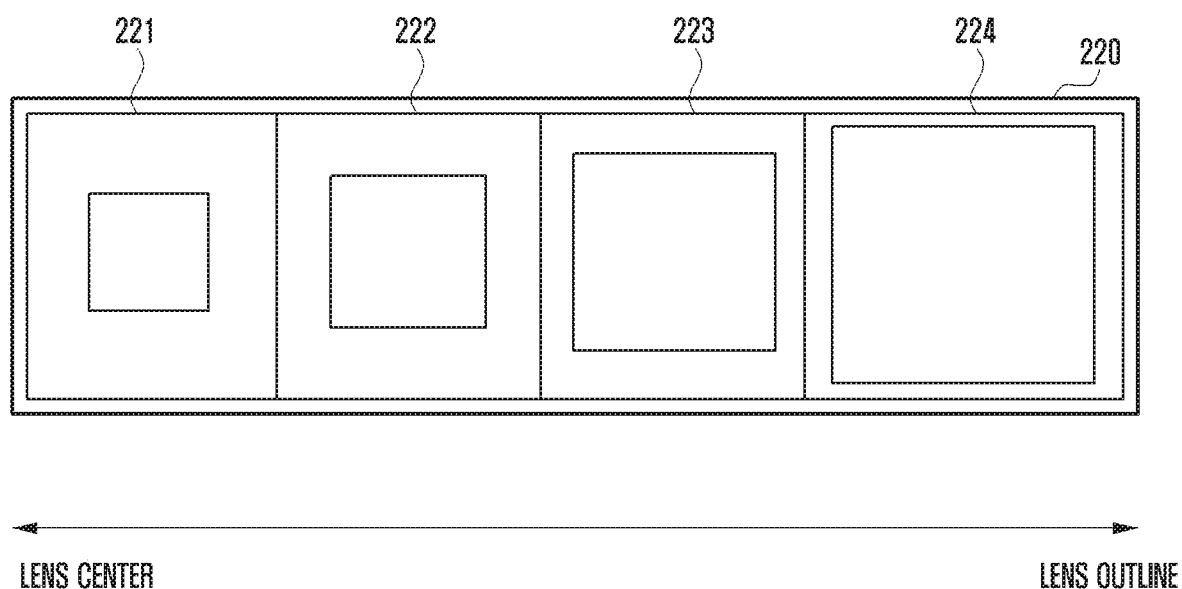
FIG. 7A is a diagram illustrating the structure of a first lens according to a first embodiment of the disclosure.

FIG. 7A is a diagram illustrating the structure of a first lens according to a first embodiment of the disclosure.

The first lens 220 according to the disclosure may be a lens in which a plurality of unit cells are combined. The respective unit cells may have different phases, and the phase distribution of the first lens 220 may be determined through combination of the respective unit cells with each other.

Meanwhile, the phase distribution parabola of the first lens 220 should have a convex shape in the same direction as the phase distribution parabola of the beamforming antenna as described above. Accordingly, in order to have the phase distribution parabola shape as described above, the phase of the first lens 220 should be decreased as going from the center of the first lens 220 toward an outline of the first lens 220.

That is, according to the disclosure, the unit cells of the first lens 220 may be successively deployed from the center of the first lens 220 in the direction of the outline of the first lens 220 in a descending order of phase change level. As an example, as illustrated in FIG. 7A, the unit cell 221 having a phase of 330° may be deployed in the center of the first lens 220, and thereafter, the unit cell 222 having a phase of 300°, the unit cell 223 having a phase of 270°, and the unit cell 224 having a phase of 240° may be deployed in order as going toward the outline of the first lens 220.

The shape and the number of unit cells constituting the first lens as illustrated in FIG. 7A are merely exemplary, and the scope of the disclosure should not be limited thereto.

Figure 7B:
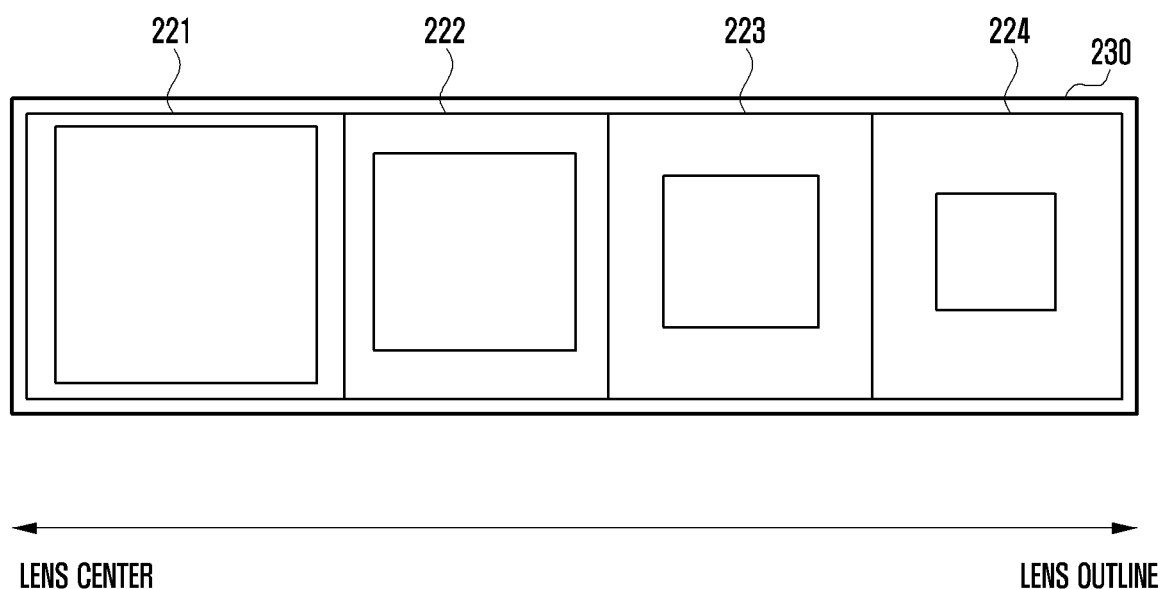
FIG. 7B is a diagram illustrating the structure of a second lens according to a first embodiment of the disclosure.

FIG. 7B is a diagram illustrating the structure of a second lens according to a first embodiment of the disclosure.

The second lens 230 according to the disclosure may also be a lens in which a plurality of unit cells are combined. The respective unit cells may have different phases, and the phase distribution of the second lens 230 may be determined through combination of the respective unit cells with each other.

Meanwhile, the phase distribution parabola of the second lens 230 should have a convex shape in an opposite direction to the phase distribution parabola of the first lens as described above. Accordingly, in order to have the phase distribution parabola shape as described above, the phase of the second lens 230 should be increased as going from the center of the second lens 230 toward an outline of the second lens 230.

That is, according to the disclosure, the unit cells of the second lens 230 may be successively deployed from the center of the second lens 230 in the direction of the outline of the second lens 230 in an ascending order of the phase change level. As an example, as illustrated in FIG. 7B, the unit cell 221 having a phase of 240° may be deployed in the center of the second lens 230, and thereafter, the unit cell 222 having a phase of 270°, the unit cell 223 having a phase of 300°, and the unit cell 224 having a phase of 330° may be deployed in order as going toward the outline of the second lens 230.

The shape and the number of unit cells constituting the second lens as illustrated in FIG. 7B are merely exemplary, and the scope of the disclosure should not be limited thereto.

Figure 8:
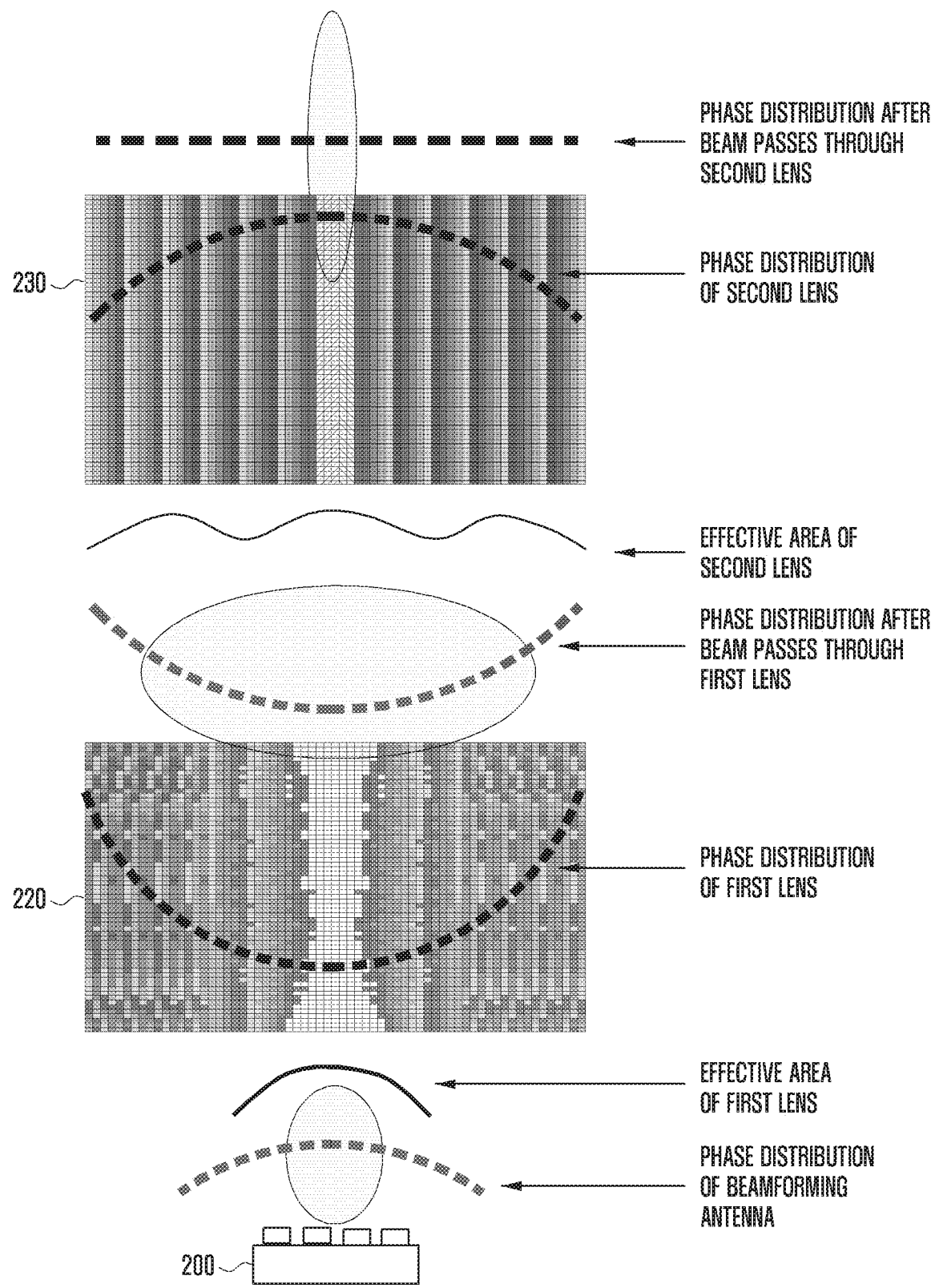
FIG. 8 is a diagram illustrating an antenna module structure according to a second embodiment of the disclosure.

FIG. 8 is a diagram illustrating an antenna module structure according to a second embodiment of the disclosure.

The antenna module structure according to the second embodiment of the disclosure is substantially equal to the antenna module structure according to the first embodiment. However, in the first embodiment and the second embodiment, the phase distributions of the first lenses 220 and the second lenses 230 are different from each other.

That is, in the antenna module structure according to the second embodiment, the phase distribution parabola of the first lens 220 may have a shape that is convex toward the beamforming antenna 200, and the phase distribution parabola of the second lens 230 may have a shape that is convex toward the beam radiation direction of the second lens 230. In this case, the curvature of the first lens phase distribution parabola may be higher than the curvature of the second lens phase distribution parabola.

Except the above-described differences, the antenna module structure according to the second embodiment is equal to the antenna module structure according to the first embodiment, the explanation of the antenna module structure according to the second embodiment is replaced by the explanation of the antenna module structure according to the first embodiment.

Figure 9A:
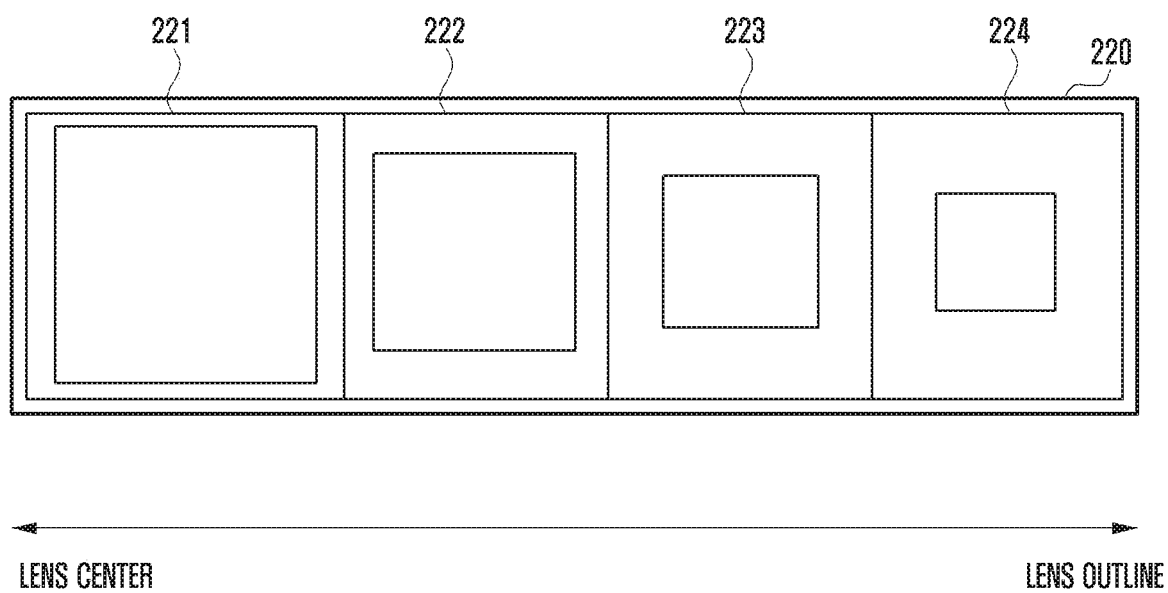
FIG. 9A is a diagram illustrating the structure of a first lens according to a second embodiment of the disclosure.
Figure 9B:
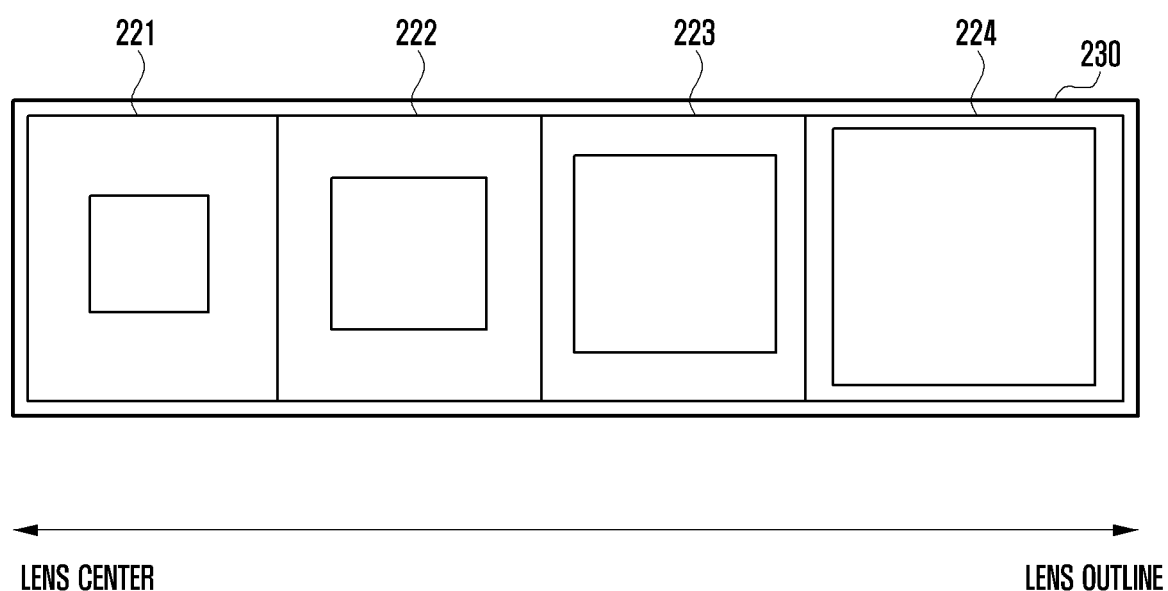
FIG. 9B is a diagram illustrating the structure of a second lens according to a second embodiment of the disclosure.

FIG. 9A is a diagram illustrating the structure of a first lens according to a second embodiment of the disclosure, and FIG. 9B is a diagram illustrating the structure of a second lens according to a second embodiment of the disclosure.

As described above with reference to FIG. 8, in the antenna module according to the second embodiment, the phase distribution of the first lens 220 and the phase distribution of the second lens 230 are different from each other. Accordingly, the structures of the first lens 220 and the second lens 230 according to the second embodiment are different from the structures of the first lens 220 and the second lens 230 according to the first embodiment.

More specifically, the phase distribution parabola of the first lens 220 according to the second embodiment should have a convex shape in an opposite direction to the phase distribution parabola of the beamforming antenna. Accordingly, in order to have the phase distribution parabola shape as described above, the phase of the first lens 220 should be increased as going from the center of the first lens 220 toward the outline of the first lens 220.

That is, according to the disclosure, the unit cells of the first lens 220 may be successively deployed from the center of the first lens 220 in the direction of the outline of the first lens 220 in an ascending order of the phase change level. As an example, as illustrated in FIG. 9A, the unit cell 221 having a phase of 240° may be deployed in the center of the first lens 220, and thereafter, the unit cell 222 having a phase of 270°, the unit cell 223 having a phase of 300°, and the unit cell 224 having a phase of 330° may be deployed in order as going toward the outline of the first lens 220.

On the other hand, the phase distribution parabola of the second lens 230 should have a convex shape in the same direction as the phase distribution parabola of the beamforming antenna 200 as described above. Accordingly, in order to have the phase distribution parabola shape as described above, the phase of the second lens 230 should be decreased as going from the center of the second lens 230 toward the outline of the second lens 230.

That is, according to the disclosure, the unit cells of the second lens 230 may be successively deployed from the center of the second lens 230 in the direction of the outline of the second lens 230 in a descending order of the phase change level. As an example, as illustrated in FIG. 9B, the unit cell 221 having a phase of 330° may be deployed in the center of the second lens 230, and thereafter, the unit cell 222 having a phase of 300°, the unit cell 223 having a phase of 270°, and the unit cell 224 having a phase of 240° may be deployed in order as going toward the outline of the second lens 230.

Meanwhile, the shape and the number of unit cells constituting the first lens and the second lens as illustrated in FIGS. 9A and 9B are merely exemplary, and the scope of the disclosure should not be limited thereto.

Figure 10A:
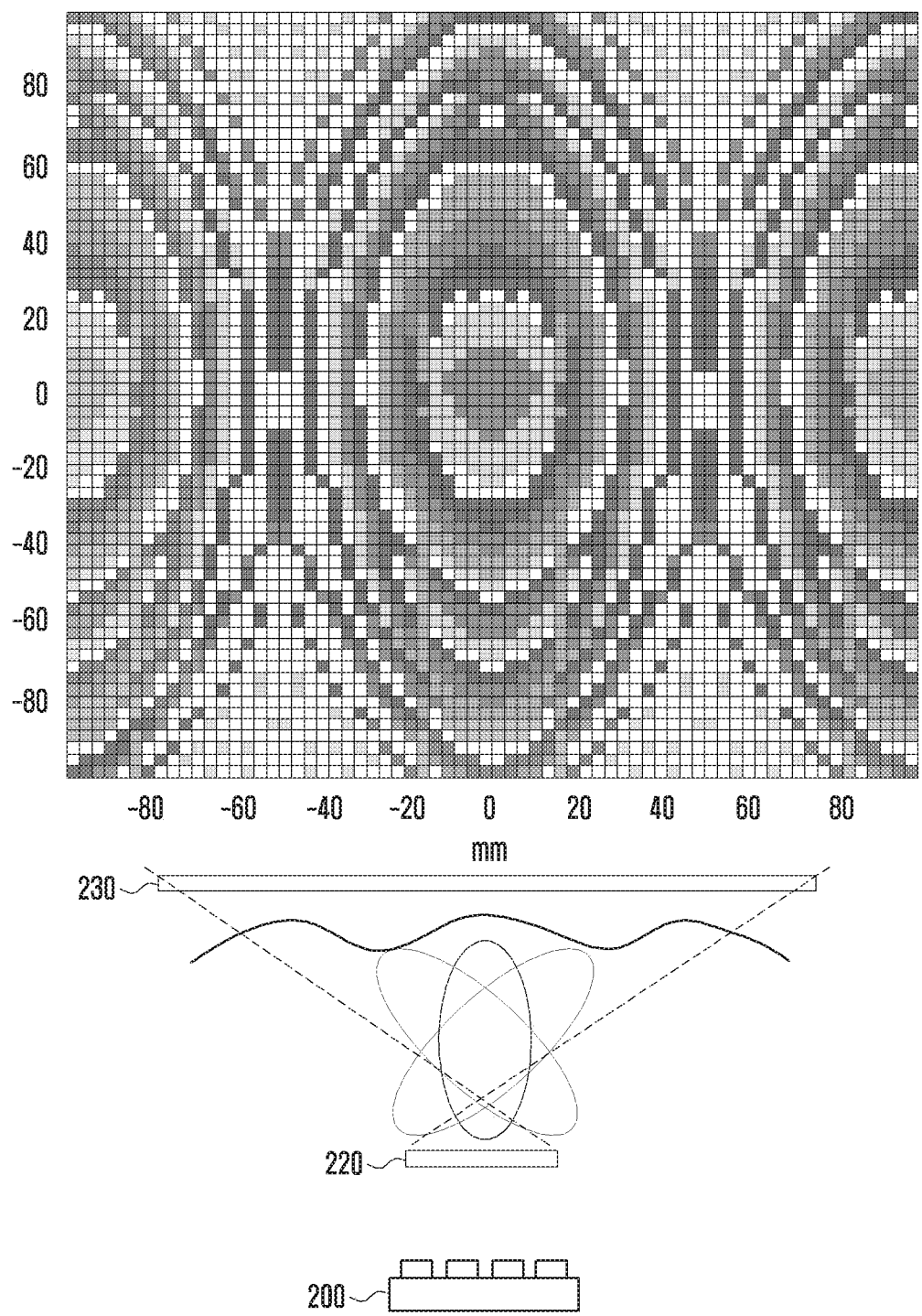
FIG. 10A is a diagram illustrating a first lens and the shape of a beam having passed through the first lens according to a first embodiment of the disclosure.

FIG. 10A is a diagram illustrating a first lens and the shape of a beam having passed through the first lens according to a first embodiment of the disclosure.

According to the first embodiment of the disclosure, as illustrated in FIG. 10A, the phases may be successively lowered as going from the center of the first lens toward the first lens outline direction. Further, the beam being radiated through the beamforming antenna 200 penetrates the first lens having the above-described phase distribution, and thus it may have the shape of a plurality of beams as illustrated in FIG. 10A.

Accordingly, the effective area of the second lens 230 onto which the beam is projected may be a large area as illustrated in FIG. 10A, and through this, the second lens 230 may radiate the sharp beam having a high gain value out of the beamforming antenna module.

FIG. 10B is a diagram illustrating a first lens and the shape of a beam having passed through the first lens according to a second embodiment of the disclosure.

According to the second embodiment of the disclosure, as illustrated in FIG. 10B, the phases may be successively heightened as going from the center of the first lens toward the first lens outline direction. Further, the beam being radiated through the beamforming antenna 200 penetrates the first lens having the above-described phase distribution, and thus it may have the shape of a plurality of beams as illustrated in FIG. 10B.

Accordingly, the effective area of the second lens 230 onto which the beam is projected may be a large area as illustrated in FIG. 10B, and through this, the second lens 230 may radiate the sharp beam having a high gain value out of the beamforming antenna module.

FIGS. 11A to 11D are diagrams illustrating an antenna module structure according to an embodiment of the disclosure.

FIGS. 11A to 11D illustrate embodiments that can be derived according to the embodiments of the disclosure. Accordingly, the scope of the disclosure should not be limited to the beamforming antenna module structure illustrated in FIGS. 11A to 11D.

Figure 11A:
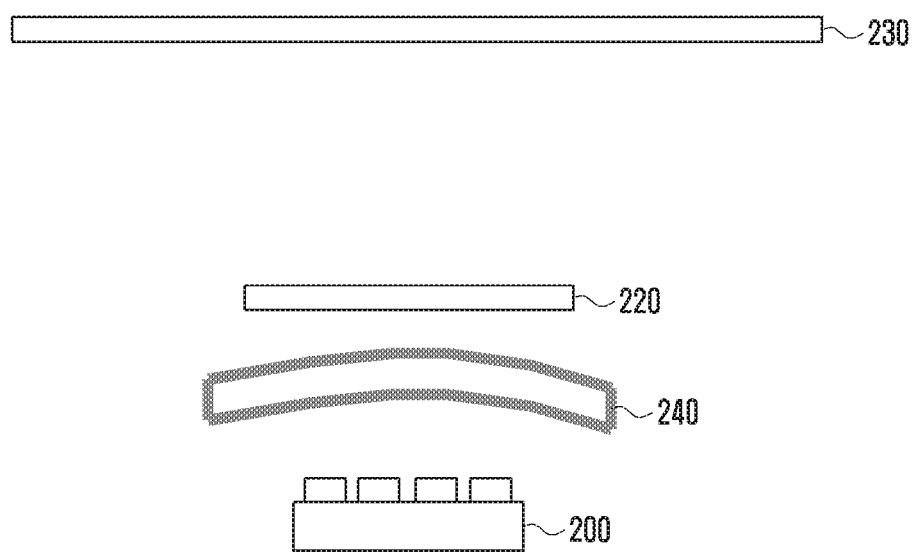
FIGS. 11A to 11D are diagrams illustrating an antenna module structure according to an embodiment of the disclosure.

The beamforming antenna module of FIG. 11A may include a beamforming antenna 200 configured to radiate a beam in a specific direction, a first lens 220 spaced apart for a predetermined first distance from a beam radiation surface of the beamforming antenna 200 and configured to change a phase of a beam radiated from the beamforming antenna 200, a second lens 230 spaced apart for a predetermined second distance from a beam radiation surface of the first lens 220 and configured to change the phase of the beam radiated from the beamforming antenna 200, and a beamforming antenna case 240 formed in the shape of a convex lens deployed between the beamforming antenna 200 and the first lens 220 and configured to surround the beam radiation surface of the beamforming antenna 200. In this case, the first lens 220 and the second lens 230 may be flat lenses, and as described above, the phase distributions of the first lens 220 and the second lens 230 may be different from each other.

Figure 11B:
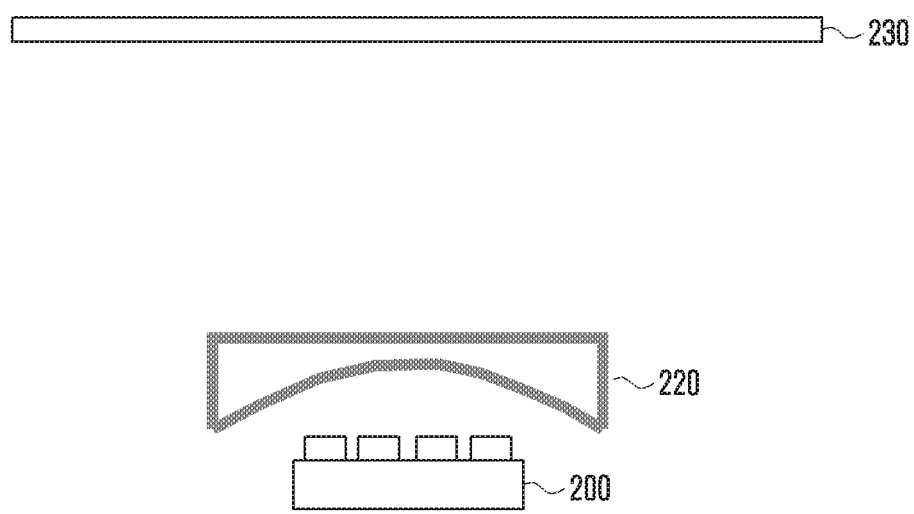

The beamforming antenna module of FIG. 11B may include a beamforming antenna 200 configured to radiate a beam in a specific direction, a first lens 220 spaced apart for a predetermined first distance from a beam radiation surface of the beamforming antenna 200 and configured to change a phase of a beam radiated from the beamforming antenna 200, and a second lens 230 spaced apart for a predetermined second distance from a beam radiation surface of the first lens 220 and configured to change the phase of the beam radiated from the beamforming antenna 200. In this case, the first lens 220 may be a concave dielectric lens, and the second lens 230 may be a flat lens, and as described above, the phase distributions of the first lens 220 and the second lens 230 may be different from each other.

Figure 11C:
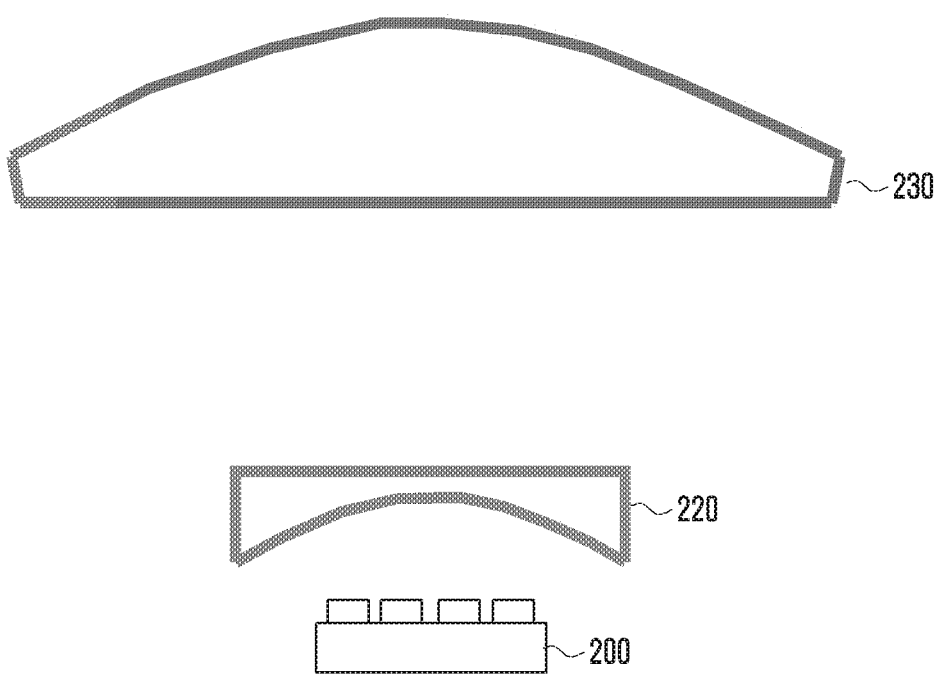

The beamforming antenna module of FIG. 11C may include a beamforming antenna 200 configured to radiate a beam in a specific direction, a first lens 220 spaced apart for a predetermined first distance from a beam radiation surface of the beamforming antenna 200 and configured to change a phase of a beam radiated from the beamforming antenna 200, and a second lens 230 spaced apart for a predetermined second distance from a beam radiation surface of the first lens 220 and configured to change the phase of the beam radiated from the beamforming antenna 200. In this case, the first lens 220 may be a concave dielectric lens, and the second lens 230 may be a convex dielectric lens, and as described above, the phase distributions of the first lens 220 and the second lens 230 may be different from each other.

Figure 11D:
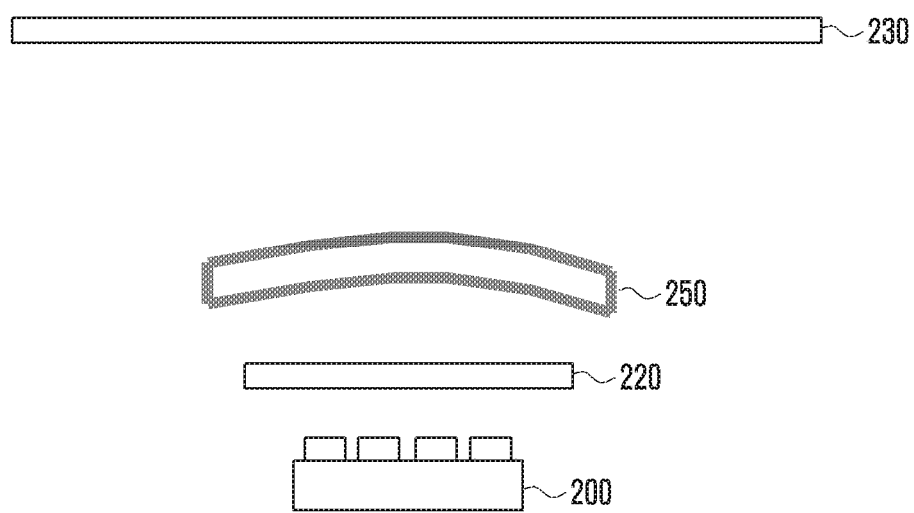

The beamforming antenna module of FIG. 11D may include a beamforming antenna 200 configured to radiate a beam in a specific direction, a first lens 220 spaced apart for a predetermined first distance from a beam radiation surface of the beamforming antenna 200 and configured to change a phase of a beam radiated from the beamforming antenna 200, a second lens 230 spaced apart for a predetermined second distance from a beam radiation surface of the first lens 220 and configured to change the phase of the beam radiated from the beamforming antenna 200, and a beamforming antenna case 250 formed in the shape of a convex lens deployed between the first lens 220 and the second lens 230 and configured to surround the beam radiation surface of the first lens 220. In this case, the first lens 220 and the second lens 230 may be flat lenses, and the phase distributions of the first lens 220 and the second lens 230 may be different from each other.

Meanwhile, embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the methods proposed in the disclosure may be combined with each other to operate the base station and the terminal. Although the above-described embodiments are proposed based on an LTE/LTE-A system, other modifications based on the technical idea of the embodiment will be able to be embodied even in other systems, such as 5G and NR systems.

The invention claimed is:

1. A beamforming antenna module comprising:
a beamforming antenna configured to radiate a beam of a phase having a first phase distribution;
a first lens spaced apart for a predetermined first distance from a beam radiation surface of the beamforming antenna and configured to change the phase of the beam radiated from the beamforming antenna according to a second phase distribution;

a second lens spaced apart for a predetermined second distance from a beam radiation surface of the first lens and configured to change the phase of the beam radiated from the first lens according to a third phase distribution; and a beamforming antenna case formed by a dielectric lens deployed between the beamforming antenna and the first lens and configured to surround the beam radiation surface of the first lens, wherein the change in phase according to the third phase distribution counters the change in phase according to the first phase distribution and the second phase distribution to radiate a beam having a substantially flat phase distribution.

2. The beamforming antenna module of claim 1,
wherein a phase of the first lens is decreased as going from a center of the first lens toward an outline of the first lens, and
wherein a phase of the second lens is increased as going from a center of the second lens toward an outline of the second lens.

3. The beamforming antenna module of claim 1,
wherein a phase of the first lens is increased as going from a center of the first lens toward an outline of the first lens, and
wherein a phase of the second lens is decreased as going from a center of the second lens toward an outline of the second lens.

4. The beamforming antenna module of claim 1,
wherein the first lens is a dielectric lens having a shape of a concave lens, and
wherein the second lens is a dielectric lens having a shape of a convex lens.

5. A beamforming antenna module comprising:
a beamforming antenna configured to radiate a beam of a phase having a first phase distribution;
a first lens spaced apart for a predetermined first distance from a beam radiation surface of the beamforming antenna and configured to change the phase of the beam radiated from the beamforming antenna through combination of unit cells having different phase change levels according to a second phase distribution;
a second lens spaced apart for a predetermined second distance from a beam radiation surface of the first lens and configured to change the phase of the beam radiated from the first lens through combination of unit cells having different phase change levels according to a third phase distribution; and a beamforming antenna case formed by a dielectric lens deployed between the beamforming antenna and the first lens and configured to surround the beam radiation surface of the first lens, wherein the change in phase according to the third phase distribution counters the change in phase according to the first phase distribution and the second phase distribution to radiate a beam having a substantially flat phase distribution.

6. The beamforming antenna module of claim 5,
wherein the unit cells of the first lens are successively deployed from a center of the first lens in a direction of an outline of the first lens in a descending order of the phase change level, and
wherein the unit cells of the second lens are successively deployed from a center of the second lens in a direction of an outline of the second lens in an ascending order of the phase change level.

7. The beamforming antenna module of claim 6,
wherein a phase distribution of the first lens has a shape of a parabola that is convex toward the second lens,
wherein a phase distribution of the second lens has a shape of a parabola that is convex toward the first lens, and
wherein a curvature of the phase distribution of the first lens is lower than a curvature of the phase distribution of the second lens.

8. The beamforming antenna module of claim 5,
wherein the unit cells of the first lens are successively deployed from a center of the first lens in a direction of an outline of the first lens in an ascending order of the phase change level, and
wherein the unit cells of the second lens are successively deployed from a center of the second lens in a direction of an outline of the second lens in a descending order of the phase change level.

9. The beamforming antenna module of claim 8,
wherein a phase distribution of the first lens has a shape of a parabola that is concave toward the beamforming antenna,
wherein a phase distribution of the second lens has a shape of a parabola that is convex toward a beam radiation direction of the second lens, and
wherein a curvature of the phase distribution of the first lens is higher than a curvature of the phase distribution of the second lens.

10. The beamforming antenna module of claim 5,
wherein the first lens is a dielectric lens having a shape of a concave lens, and
wherein the second lens is a dielectric lens having a shape of a convex lens.

* * * * *